United States Patent Office 3,368,902
Patented Feb. 13, 1968

3,368,902
CORN CHIP
Isadore A. Berg, 1613 Asmann Ave.,
Cincinnati, Ohio 45229
No Drawing. Continuation-in-part of application Ser. No. 352,980, Mar. 18, 1964. This application Mar. 22, 1967, Ser. No. 625,004
12 Claims. (Cl. 99—83)

ABSTRACT OF THE DISCLOSURE

A process of making a corn chip including the steps of cooking corn and grinding it to form a masa, recooking the masa with additional water to form a gelatinized mass, forming small particles of the mass, drying the particles and frying them in cooking oil.

Related applications

This is a continuation-in-part of application Serial No. 352,980 filed Mar. 18, 1964 now abandoned.

This invention relates to a corn chip and a method of making it, and more particularly the invention is directed to the making of a corn chip having improved structural or physical characteristics and flavor.

Corn chips have been known and commercially produced for many years and have certain pronounced characteristics by which they are distinguished. In general, it can be said that the known corn chips are hard, dense and greasy. The chips do not have a particularly distinctive corn flavor pronounced and in fact the taste of the corn is somewhat difficult to perceive. The hardness and density of the prior art product are in a sense interrelated. While the product is somewhat porous or has a cellular structure, the cell structure has thick walls. The surface of the chips is rather smooth and dense, all of which results in a distinctive, hard, brittle characteristic when the chip is bitten. The resultant chip of the prior art is also greasy, or high in fat content which actually means that its caloric value is high. The chip is about 36% oil by weight. The high fat content not only is undesirable from the standpoint of those who have difficulty controlling their weight, but the chips quickly satisfy the appetite of any person eating them.

The objective of the invention has been to provide a corn chip which is dramatically improved in those principal characteristics referred to above. Whereas the prior art corn chips are characterized by being hard, dense and greasy, the chip of the present invention is light, crispy, tender, and of a markedly lower grease content. The light crispy quality of the chip can be more specifically defined as being a porous or puffed cellular structure in which the individual cells are markedly larger with thinner walls than those of the prior chips. The product is, therefore, quite crisp and crunchy and has two other quite remarkable characteristics. It has been found that the chip can be exposed to the atmosphere for a considerable period of time as, for example, two weeks or so without appreciably altering its crispness and corn taste. Additionally, and perhaps more importantly, the chip of the present invention imparts a more pronounced corn flavor immediately to the taste buds when it is eaten.

The lightness of the chip can be defined and compared to that of the prior art by reference to its bulking. The bulking is determined by the weight of the chips which can be packed into a container of a preselected volume. Considering, for example, chips which are approximately 1¾ inches by 1⅛ inches and extruded through a ⅟₁₆-inch wide orifice, it was possible to pack 4.45 ounces of the prior art chips into a 22 liquid ounce jar. It was possible only to pack 1.76 ounces of the chips of the invention in the same jar. In other words, the chip of the present invention bulks at about 2½ times the prior art chips. Stated another way, the density of the prior art chip is 0.2 ounce per liquid ounce of volume and the chip of the present invention has a bulk density of about 0.08 ounce per liquid ounce of volume.

It is believed that the increased surface area which is exposed to the taste buds by the chip of the present invention results in an intensification of the flavor of the chip. When bitten, the open texture of the chip offers much less resistance to the bite and the particles are much more completely disintegrated, thereby creating a greater exposure of the chip parts to the area of the taste buds which results in a perceptibly increased corn flavor.

While there are undoubtedly variations in the processes of the prior art, in general they follow approximately the steps set forth below:

(a) Whole kernel corn is steeped and boiled for about 60 minutes in a solution of water and calciumed hydroxide.

(b) Water is added to make up for that evaporated by the boiling and to cover the corn, and the boiled corn is set aside for one day.

(c) The water is drained and the corn is washed.

(d) The corn is ground to a masa which is an agglomerated mass.

(e) The masa is extruded into strips which are cut into short pieces and dropped into a vat of corn oil at approximately 390° F. and fried for around 1½ minutes.

The resultant chip is brownish, dense, and contains about 36% by weight of oil. The bulk density is around 0.2 per liquid ounce of volume.

The process of the present invention is distinguishable from that of the prior art in a number of respects, which will be disclosed in more detail below. However, there are certain principal differences which should be pointed out distinctly. Of these, the most important is the step of adding water and cooking the masa. In the prior art practices, the cooked corn is ground to form a masa. The masa is then extruded and fried. In the present invention, however, after grinding the corn to form the masa, water is added to it and it is boiled for an additional length of time in order to form a gelatinized mass. This step more than any of the others imparts to the product a quality which permits it, upon frying, to expand and develop its crispy, bubbly, cellular structure.

The product can be improved additionally by adding corn starch and salt to the masa as it is being cooked. The product can be further improved by adding a small amount of sodium carboxymethyl cellulose (CMC) to the gelatinized mass. The product is still further improved over those of the prior art by permitting the product to dry to about 10% moisture before it is introduced into the cooking oil.

The objective of the introduction of these additional steps and constituents into the process is to provide a gelatinized dried strip or pellet which will puff or expand during the oil frying step to a far greater degree than is possible in the prior art process. The manner in which the additional steps and constituents cooperate to produce this expansion phenomenon will be explained in greater detail below.

More specifically and completely, the process of the present invention is as follows:

The process will be described in relation to 100 pounds of total solids employed exclusive of the sodium carboxymethyl cellulose, and these quantities by weight will be easily convertible to percentages so that the process can be applied to greater or lesser quantities.

Step 1.—A 94½ pound mixture of ⅔ white and ⅓ yellow whole kernel corn is placed in a steam jacketed kettle and covered with water. One and one-fourth pounds calcium hydroxide is added and stirred until uniformly dispersed. This mass is heated and brought to boiling and maintained at boiling point for approximately 30 minutes.

The amount of water selected is that which sufficiently covers the corn. As water is lost during the boiling, or as the corn kernels swell and absorb water, additional water should be added to keep the corn covered.

The 1¼ pounds of calcium hydroxide is the minimum required to bring out the flavor of the corn in the final product. I have found that if the calcium hydroxide is reduced to approximately 1% or one pound, the corn flavor of the resultant product is not as distinct as when the perferred amount of calcium hydroxide is added. I have found that the amount of calcium hydroxide can be increased to 1½% and the corn flavor will be similar to that wherein 1¼% is used. With variations in the corn, some slight increases above 1¼% may be necessary to obtain the required corn flavor.

I prefer to boil the corn to the point whereby its water absorption is 40 to 43% after cooling for one hour. From experience, I find that it takes approximately 30 to 40 minutes boiling. If boiled for a longer time so that the corn absorbs a higher amount of water than 43%, it appears to affect the starch so that in the final frying step the dried pellets do not expand as well as the product which has been cooked so that after cooling the moisture absorption is 40% to 43%. The variation in boiling time is dependent on the character of the corn, in that one lot of corn may absorb moisture in cooking faster than another lot.

Step 2.—The boiled corn has cold water added to it so that it is well covered by the cold water. The corn is permitted to cool for one hour. During the cooling step some water will be absorbed by the corn.

Step 3.—The water is drained from the corn and the corn is washed. During the preliminary boiling and cooling steps, referred to above, the water takes on a cloudy appearance and it is the function of the draining and washing step to remove all extraneous substances and further to remove the last traces of free calcium hydroxide.

Step 4. The corn is ground to form a masa which is an agglomerated mass whose weight is now approximately 157 pounds. In other words, the corn has taken on slightly more than 66% of its original weight in water. The masa is placed in a steam jacketed kettle and is mixed by stirring with an additional 212 pounds of water, 5 pounds of corn starch and ½-pound of sodium chloride salt. The mixture is stirred and cooked for about 15 minutes until the mixture has thickened into a heavy homogenous mass, indicating the substantially full gelatinization of the starch in the corn and added corn starch.

I calculate the amount of water by multiplying the weight of masa by 1.25 and by multiplying the weight of the added dry corn starch by 3.25. When the corn starch constitutes 5% of the solids, the added water will be approximately 1.35 times the weight of the masa. If substantially less water is used, the product will not be as fully gelatinized and if a greater amount of water is used the product will be thin, difficult to extrude and will not produce an ultimate product having the desired texture characteristics described above.

The additives of unmodified corn starch, salt and CMC are necessary since some changes have taken place in the starch molecules of the natural corn by being subjected to the boiling process with the calcium hydroxide which has modified their associated bonding properties. To form a dried pellet which will puff and expand to the proper degree as outlined above, it is required that the bonding between the starch molecules within the film or strip be very highly and strongly associated. The three additives of starch, salt, and CMC provide the necessary highly and strongly associated bonding between the starch molecules so that the dried pellets will puff and expand as required.

Although larger amounts of corn starch than 5% may be added, an increase in the corn starch results in a decrease in the natural corn flavor of the ultimate product. Furthermore, the effect of the unmodified corn starch is substantially increased by the additional of the CMC which has such a marked effect in increasing the thickness or viscosity of the gelatinized mass.

The salt added may be from ¼ to 2% by weight of the solids. The salt adds to the flavor of the ultimate product and appears to have a beneficial effect of the gelatinizing and puffing upon frying of the product. I prefer ½% of salt since it aids in obtaining the desired puffing characteristics and flavor.

The length of time of heating and stirring is relatively short and can be determined by the appearance and viscosity of the mixture. Too short a period will fail to produce the desired full gelatinization. Longer cooking does not appear to increase the viscosity of the mixture and is therefore unnecessary.

The resultant homogeneous mass has a moisture content of about 75%.

Step 5.—The heat is taken off the kettle and 2 pounds of sodium carboxymethyl cellulose (CMC) is stirred into the heavy mass which tends to thicken further.

There are two desired effects produced by the sodium carboxymethyl cellulose (CMC). Additional thickening of the mass is produced. Additonally, the CMC is a grease blocker. That is to say, the product which includes the CMC will absorb less fat when it is introduced into the frying corn oil. The added thickening imparts a greater expansion of puffiing characteristic during the frying and the reduction of the grease or fat absorption combine to result in a product which is lighter and contains less grease or oil than a product which does not employ CMC.

Step 6.—The gelatinized mass is extruded through die openings which are 1¾₁₆ inches wide and ⅟₁₆-inch high and the extruded strips are deposited into rows on pallets. The strips are cross cut into about 2 inch length and the pallets are placed on racks for drying. The pieces are dried at around 80° F. and in such a manner that they will dry slowly so that the starch molecules have sufficient time to associate. When the pieces show signs of shrinking and hardening, the temperature may be increased to 90° F. and air of around 40% relative humidity gently circulated around the pieces. This drying is continued until the pieces are uniformly hardened and moisture content is around 10%. The pieces are ready for prompt frying but, if desired, may then be placed in moisture proof containers and stored for extended periods and can be shipped to distant plants for frying and packaging.

The moisture content should not be reduced much less than 10% water for a piece of a lower moisture content, upon frying, will not fully expand and be a hard, tough product.

Step 7.—The pieces are dropped into corn oil at 380° to 390° F. and fried for 30 seconds. During this brief frying time, the pieces puff to about 5 times their normal size. The resultant product contains only 20 to 25% and usually around 23% by weight of oil and bulks at 0.08 ounce per liquid ounce of volume.

*Example 1*

Ninety-four and one-half pounds of a mixture of whole kernel corn constituted by ⅓ yellow and ⅔ white kernels was placed in a steam jacketed kettle and covered with water. One and one-quarter pounds of Ca(OH)$_2$ were stirred into the mixture. The mixture was boiled for 30 to 35 minutes during which time water was added to keep the corn covered. Cold water was added to bring up the water level as before boiling and the contents were cooled for one hour. The water was drained and the corn was washed. The corn was ground to form a masa. Two hundred and twelve pounds of water, five pounds of corn starch, and one-half pound of salt were mixed with the masa and the mixture was cooked for around 15 minutes until it thickened into a heavy mass. Two pounds of sodium carboxymethyl cellulose were stirred into the mass. The mass was extruded into strips through a rectangular orifice 1¾₁₆ inches wide and ⅟₁₆-inch high and the strips were cut into 2 inch lengths. These strips were dried at 80° F. When the pieces showed signs of shrinking and hardening, the temperature was increased to 90° F. and air was gently circulated around the pieces. When the moisture content was reduced to around 10%, the pieces were ready for frying. The pieces were dropped into corn oil at 390° F. and fried for 30 seconds.

The resultant product contained approximately 20 to 25% oil and had a bulk density of about 0.08 ounce per liquid ounce of volume. Physically the product was characterized by being light and crisp and of a pronounced cellular structure having a bubbled outer surface. The product had an immediately perceptible corn taste.

*Example 2*

One hundred parts by weight of corn kernels and two-thirds part by weight of calcium hydroxide were placed in a kettle and covered with water. This mixture was boiled for 45 minutes during which time water was added to keep the corn covered. Cold water was added to bring up the water level as before boiling and the contents were cooled for one hour. The corn was then drained of its water and washed with water. The corn was then ground to form a masa. The masa was weighed and it was determined that it had picked up 42.2% of water. The masa was mixed with sufficient water to form a mixture of approximately 45% masa and 55% water which forms a suspension of the masa in the water. This mixture was boiled for 20 minutes, whereby the masa was gelatinized into a thick mass.

The gelatinized mass was extruded into strips which were dried to about 10° moisture. The strips were placed in cooking oil at a temperature of 390° F. for about 30 seconds. During the frying, the chips expanded to about four times their size and the resultant chip had a bubbly or cellular surface, a crispy tenderness, and a tasty corn flavor. They bulked at about 1¾ times that of corn chips which had been prepared without the boiling of the masa.

*Example 3*

A gelatinized masa was prepared as described in Example 2 and a mixture of 25% of dry gelatinized starch and 75% of water was added to to the gelatinized masa so that the corn of the masa was about 94 parts and the dry starch was about 6 parts of the mixture. This masa was extruded into strips, dried, and fried as in Example 2.

The expansion of the strips upon frying was about 20% greater than that of Example 2.

The mixture of pregelatinized starch with water when added to the cooked gelatinized masa created a problem in mixing since the gelatinized starch does not blend too easily with the gelatinized masa and therefore special mixing devices are necessary to make a uniform masa for extruding.

*Example 4*

A corn chip was prepared following the steps of Example 2 except that, before the second boiling step, regular corn starch was added to the masa to make a mixture of approximately 94 parts of corn and 6 parts dry starch by weight. When the corn starch was added, sufficient water was added to form a suspension in which there is approximately 75% water and 25% dry corn and starch by weight.

The resultant corn chip was similar to that of Example 3.

*Example 5*

The steps of Example 4 were performed with the added step of adding about ½-part by weight of salt to the masa before it was boiled. The addition of the salt appeared to improve the expansion, crispness, and taste of the corn chip.

*Example 6*

The steps of Example 4 were performed with the addition of stirring about 1.5 to 2 parts by weight of sodium carboxymethyl cellulose (CMC) into the boiling masa. The addition of the CMC increased the expansion of the corn chip by about 5%, the fat content of the corn chip decreased around 4%, and the crispy tenderness of the chip was improved.

*Example 7*

The steps of Example 4 were performed except that instead of regular corn starch, corn meal equal to the amount of masa corn by weight was added to the masa. The resultant corn chip was very satisfactory, yielding a bubbly cellular surface which had expanded to about four times the size of the extruded strip.

*Example 8*

The steps of Example 7 were performed except that corn flour was substituted for corn meal with substantially the same results.

I claim:
1. The process of forming corn chips from a masa dough comprising the steps of,
    mixing the masa with water,
    cooking the mixture until it forms a thick gelatinized mass to facilitate puffing and expanding upon frying,
    forming said mixture into pieces and drying them until the pieces are uniformly hardened, and
    deep frying the dried pieces.

2. The process according to claim 1 in which the pieces are dried to approximately 10% moisture content prior to deep frying.

3. The process of forming corn chips from a masa dough comprising the steps of,
    mixing the masa with water and with regular corn starch in amounts sufficient to facilitate puffing and expanding upon frying,
    cooking the mixture until it forms a thick gelatinized mass to facilitate puffing and expanding upon frying,
    forming said mixture into pieces and drying them, and
    deep frying the dried pieces.

4. The process of forming corn chips from a masa dough comprising the steps of,
    mixing the masa with water,
    cooking the mixture until it forms a thick gelatinized mass to facilitate puffing and expanding upon frying,
    mixing the gelatinized mixture after cooking with gelatinized corn starch and water in amounts sufficient to facilitate puffing and expanding upon frying,
    forming said mixture into pieces and drying them, and
    deep frying the dried pieces.

5. The process of forming corn chips from a masa dough comprising the steps of,
    mixing the masa with water and with corn meal in amounts sufficient to facilitate puffing and expanding upon frying,
    cooking the mixture until it forms a thick gelatinized mass to facilitate puffing and expanding upon frying,
    forming said mixture into pieces and drying them, and
    deep frying the dried pieces.

6. The process according to claim 5 in which the percentage of solids is approximately 94.5% corn, 5% corn starch, and 0.5% salt by weight.

7. The process of forming corn chips from a masa dough comprising the steps of,
    mixing the masa with water and with corn starch and salt, the water being approximately 1.25 times the weight of the masa plus 3.25 times the weight of the corn starch, cooking the mixture until it forms a thick gelatinized mass to facilitate puffing and expanding upon frying, forming said mixture into pieces and drying them, and deep frying the dried pieces.

8. The process of forming corn chips from a masa dough comprising the steps of, mixing the masa with water, cooking the mixture until it forms a thick gelatinized mass to facilitate puffing and expanding upon drying, stirring sodium carboxymethyl cellulose in amounts sufficient to facilitate puffing and expanding the gelatinized mixture upon frying, forming said gelatinized mass into pieces and drying them, and deep frying the dried pieces.

9. The process according to claim 8 in which the sodium carboxymethyl cellulose is approximately 2% of the total solids.

10. The process of making corn chips comprising the steps of, boiling whole kernel of corn with calcium hydroxide for approximately thirty minutes, cooling the corn and water, draining and washing the corn with water, grinding the corn into a masa, mixing the masa with about 1.35 times its weight of water, corn starch, and salt wherein the percentages of solids are approximately as follows: 94.5% corn, 5% corn starch, and ½% salt, cooking the mixture for about fifteen minutes, adding approximately 2% sodium carboxymethyl cellulose to the mixture, forming the mixture into small strips, subjecting the strips to approximately 80° F. until the pieces show signs of shrinking and hardening, subjecting the pieces to 90° F. and gently circulating air of approximately 40% relative humidity until the strips have a moisture content of approximately 10%, and deep frying the strips.

11. The process of making corn chips comprising the steps of, boiling whole kernels of corn with calcium hydroxide for approximately thirty minutes, cooling the corn and water, draining and washing the corn with water, grinding the corn into a masa, mixing the masa with about 1.35 times its weight of water, corn starch, and salt wherein the percentages of solids are approximately as follows: 94.5% corn, 5% corn starch, and ½% salt, cooking the mixture for about fifteen minutes, adding approximately 2% sodium carboxymethyl cellulose to the mixture, forming the mixture into small strips, drying the strips to a moisture content of approximately 10%, and deep frying the strips.

12. A corn chip constituted in parts by weight by 94½ parts corn, 5 parts corn starch, ½-part sodium chloride, 2 parts carboxymethyl cellulose, said chip being cellular, having a bubbled outer surface, and having a bulk density of around 0.08 ounce per liquid ounce of volume and an oil content of 20 to 25%.

References Cited

UNITED STATES PATENTS

| | | | |
|---|---|---|---|
| 2,916,378 | 12/1959 | Kunce et al. | 99—80 |
| 3,083,103 | 3/1963 | Anderson et al. | 99—80 |
| 3,278,311 | 10/1966 | Brown et al. | 99—80 |

RAYMOND N. JONES, *Primary Examiner.*